(12) United States Patent
Kimura

(10) Patent No.: US 7,927,217 B2
(45) Date of Patent: Apr. 19, 2011

(54) NETWORK GAME SYSTEM, GAME SERVER SYSTEM, CLIENT SYSTEM, NETWORK GAME PROCESSING METHOD, AND RECORDING MEDIUM

(75) Inventor: Masaaki Kimura, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 1682 days.

(21) Appl. No.: 10/319,712

(22) Filed: Dec. 16, 2002

(65) Prior Publication Data

US 2003/0114226 A1    Jun. 19, 2003

(30) Foreign Application Priority Data

Dec. 14, 2001    (JP) ................................. 2001-380807

(51) Int. Cl.
*G06F 17/00* (2006.01)
*G06F 15/00* (2006.01)

(52) U.S. Cl. ................. 463/42; 463/30; 463/31; 463/32

(58) Field of Classification Search .............. 463/30–32, 463/42; 709/203, 231; 340/3.21; 726/13
See application file for complete search history.

(56) References Cited

U.S. PATENT DOCUMENTS

| | | | | | |
|---|---|---|---|---|---|
| 5,675,721 | A | * | 10/1997 | Freedman et al. | 345/502 |
| 5,769,718 | A | * | 6/1998 | Rieder | 463/31 |
| 5,801,680 | A | * | 9/1998 | Minakuchi | 345/589 |
| 5,956,038 | A | * | 9/1999 | Rekimoto | 345/419 |
| 5,982,390 | A | | 11/1999 | Stoneking et al. | |
| 6,020,885 | A | * | 2/2000 | Honda | 715/757 |
| 6,267,674 | B1 | * | 7/2001 | Kondo et al. | 463/32 |
| 6,270,416 | B1 | * | 8/2001 | Komoto | 463/43 |
| 6,306,033 | B1 | * | 10/2001 | Niwa et al. | 463/1 |
| 6,306,036 | B1 | * | 10/2001 | Burns et al. | 463/31 |
| 6,319,119 | B1 | * | 11/2001 | Konoe et al. | 463/2 |
| 6,390,922 | B1 | * | 5/2002 | Vange et al. | 463/42 |
| 6,729,960 | B1 | * | 5/2004 | Matsuno | 463/30 |
| 6,736,724 | B1 | * | 5/2004 | Erikawa et al. | 463/7 |
| 6,755,743 | B1 | * | 6/2004 | Yamashita et al. | 463/42 |
| 6,820,265 | B1 | * | 11/2004 | Stamper et al. | 719/312 |
| 6,826,523 | B1 | * | 11/2004 | Guy et al. | 703/22 |

(Continued)

FOREIGN PATENT DOCUMENTS

EP    1132124    9/2001

(Continued)

OTHER PUBLICATIONS

English Language Abstract of WO 01/57678.

*Primary Examiner* — David L Lewis
*Assistant Examiner* — William H McCulloch
(74) *Attorney, Agent, or Firm* — Greenblum & Bernstein, P.L.C.

(57) ABSTRACT

To prevent a network response to a game server from deteriorating, a flag information management unit of a game server is provided. The flag information management unit manages flags indicating information on player characters (PC) in response to requests from client systems (or communication terminals)s occurring during network game progress. A flag information transmission unit transmits only the information linked to the managed flags to the client systems (or communication terminals). Then, on the sides of the client systems (or communication terminals), a control unit controls a CD-ROM drive in accordance with the information, and the necessary information is reproduced from a CD-ROM.

20 Claims, 13 Drawing Sheets

U.S. PATENT DOCUMENTS

| | | | |
|---|---|---|---|
| 6,932,708 B2* | 8/2005 | Yamashita et al. | 463/42 |
| 6,999,094 B1* | 2/2006 | Ito | 345/582 |
| 7,293,235 B1* | 11/2007 | Powers et al. | 715/706 |
| 7,575,518 B2* | 8/2009 | Tabata | 463/40 |
| 7,639,251 B2* | 12/2009 | Gu et al. | 345/419 |
| 2002/0032744 A1* | 3/2002 | Magoshi et al. | 709/217 |
| 2003/0040361 A1* | 2/2003 | Thorner | 463/36 |
| 2004/0142746 A1* | 7/2004 | Hinami et al. | 463/32 |
| 2009/0137320 A1* | 5/2009 | Kimura | 463/42 |

FOREIGN PATENT DOCUMENTS

| | | |
|---|---|---|
| WO | WO 01/57678 | 8/2001 |

\* cited by examiner

FIG. 4

| CLIENT | CHARACTER (BOTH PC AND NPC) | | | | | | | | |
|---|---|---|---|---|---|---|---|---|---|
| | A-CHARACTER | B-CHARACTER | C-CHARACTER | D-CHARACTER | ........ | ........ | ........ | ........ | NPC X |
| CLIENT (A) | | o | o | o | o | o | o | o | o |
| CLIENT (B) | o | | o | o | o | o | o | o | o |
| .... | | | | | | | | | |
| CLIENT (X) | o | o | o | | o | o | o | o | o |

| | A-CHAR-ACTER | B-CHAR-ACTER | NPC ① | NPC ② | NPC ③ | FT |
|---|---|---|---|---|---|---|
| CLIENT (A) | | 0 | 0 | 0 | 0 | |
| CLIENT (B) | 0 | | 1 | 1 | 1 | |

S903

| | A-CHAR-ACTER | B-CHAR-ACTER | NPC ① | NPC ② | NPC ③ | FT |
|---|---|---|---|---|---|---|
| CLIENT (A) | | FE | FE | FE | FE | FE |
| CLIENT (B) | FE | | 1 | 1 | 1 | 1 |

S906

| | A-CHAR-ACTER | B-CHAR-ACTER | NPC ① | NPC ② | NPC ③ | FT |
|---|---|---|---|---|---|---|
| CLIENT (A) | | 1 | 1 | 1 | FE | FE |
| CLIENT (B) | FE | | 1 | 1 | 1 | 1 |

S909

| | A-CHAR-ACTER | B-CHAR-ACTER | NPC ① | NPC ② | NPC ③ | FT |
|---|---|---|---|---|---|---|
| CLIENT (A) | | 1 | 1 | 1 | FE | FE |
| CLIENT (B) | 1 | | 1 | 1 | 1 | 1 |

S911

| | A-CHAR-ACTER | B-CHAR-ACTER | NPC ① | NPC ② | NPC ③ | FT |
|---|---|---|---|---|---|---|
| CLIENT (A) | | 1 | 1 | 1 | FE | 05 |
| CLIENT (B) | 1 | | 1 | 1 | 1 | 1 |

S914

| | A-CHAR-ACTER | B-CHAR-ACTER | NPC ① | NPC ② | NPC ③ | FT |
|---|---|---|---|---|---|---|
| CLIENT (A) | | 05 | 1 | 1 | FE | 05 |
| CLIENT (B) | 1 | | 1 | 1 | 1 | |

S917

| | A-CHAR-ACTER | B-CHAR-ACTER | NPC ① | NPC ② | NPC ③ | FT |
|---|---|---|---|---|---|---|
| CLIENT (A) | | 1 | 1 | 1 | 1 | 05 |
| CLIENT (B) | 1 | | 1 | 1 | 1 | |

NETWORK GAME SYSTEM, GAME SERVER SYSTEM, CLIENT SYSTEM, NETWORK GAME PROCESSING METHOD, AND RECORDING MEDIUM

CROSS REFERENCE TO RELATED APPLICATION

The present disclosure relates to subject matter contained in Japanese Patent Application No. 2001-380807, filed on Dec. 14, 2001, the disclosure of which is expressly incorporated herein by reference in its entirety.

BACKGROUND OF THE INVENTION

1. Field of the Invention

The present invention relates to managing the information of a player character (PC) to be transmitted to each client system (or communication terminal) in a network game, with flags.

2. Description of the Related Art

In a network game in which client systems (or communication terminals) used by an indefinite number of players are connected with a game server, each client system (or communication terminal) has to display a player character (PC) controlled by a player of the client system and player characters (PCs) controlled by other players.

When the information on the player character (PC) is to be transmitted from the game server to each client (or communication terminal), the information on the player characters (PC) increases according to the number of player characters (PC) to be displayed. This increased number of player characters to be displayed degrades the network response to the game server.

In the network game in which the positions of the individual player characters (PCs) are managed by the game server, there has been conceived a method in which: an area where each player character (PC) can move is divided into virtual cells; the information of each player character (PC) is selected at the unit of each cell; one player character (PC) similar to another is selected; and the information on that player character (PC) is transmitted.

As shown in FIG. 10, specifically, the area where each player character (PC) can move is assumed to be an arbitrary field F, which is divided into two-dimensional cells (0, 0) to (3, 2). It is then assumed that a character A selected by a player is located at (1, 1) whereas characters B and C selected by other players are located at (2, 2). The data structure of this case is:

Cell (1, 1)→A→NULL;
and
Cell (2, 2)→B→C→NULL.

In case where a new character is added, as shown in FIG. 11, a cell is calculated based upon the coordinates where the new character (at step 1101) exists, and is registered in a cell linked list of the calculated cell (at step 1102) Here, the cell linked list means a management table for linking a cell and a character existing in the cell. When the character is modified (or moved), as shown in FIG. 12, the cell is calculated based upon the coordinates before the movement of the character (at step 1201), and is deleted from the cell linked list of the cells before the movement (at Step 1202). Then, the cell where the moved character exists is calculated based upon the coordinates after the movement (at Step 1203). Then, the character is registered (at Step 1204) in the cell linked list of the cells after the movement.

In case a character is deleted (or erased), as shown in FIG. 13, the cell before movement is calculated based upon the coordinates before the movement of the character (at Step 1301), and the cells before the movement are deleted from the cell linked list (at Step 1302). In the case of detecting characters within a predetermined distance between the characters, as shown in FIG. 14: cells within the range of a predetermined distance are calculated (at Step 1401) and are identified (at Step 1402); player characters (PC) existing in the identified cells are enumerated (at Step 1403). It is then decided (at Step 1404) whether each player character (PC) is within the predetermined distance. Predetermined processing is done (at Step 1405) if identified player characters are within the predetermined distance. After the processing, the logic transfers to the cell identification (at Step 1402). If the player characters are not within the predetermined distance, the logic returns to the cell enumeration (at step 1402). Here, the predetermined distance between the characters is the area enclosed by a circle around the character A as shown in FIG. 10. Moreover, this circled area corresponds to the display area of the screen of the client (or communication terminal) controlling the character A.

Moreover, the predetermined processing at (Step 1405) is processing during the network game and processing covering all the following processing by using a near member list or a list of the characters within a predetermined range:

1) To transmit a chat message;
2) To search for the enemies of the player characters or non-player characters (NPC); and
3) To transmit the positions of the player characters to the clients (or communication terminals).

In the aforementioned method of the prior art for transmitting the information on another player character (PC) near one player character (PC), the information of the player character (PC) to be displayed has to be fully transmitted at each time. In case where a number of characters are to be simultaneously moved or change their equipment, therefore, the quantity of information increases to cause a problem that the network response to the game server deteriorates.

SUMMARY OF THE INVENTION

The present invention has been conceived in view of the problems thus far described and has an object to prevent the network response to the game server from deteriorating. In order to achieve the above object, according to a first aspect of the invention, there is provided a network game system. The network game system includes a game server system that provides a network game environment. The network game system further includes multiple client systems connected with the game server system via a network, wherein client information and character information are transferred in accordance with game progress between the game server system and the client systems. The game server system includes a client management system that manages the client systems by identifying the client systems individually based upon the client information added to requests sent from the client systems via the network. The client information indicates which client system sent the request.

The game server system further includes a flag information management system that manages flags indicating the character information in response to the requests from the client systems occurring during the game progress. The flags are associated with the client information for each of the identified client systems. The game server system further includes a flag information transmitter that transmits only the character information associated with the flags, to the identified client systems. The game server system further includes a communication interface that receives the requests from the client systems. The game server system further includes a storage that stores a flag table, including the flags associated with multiple characters in association with the client information for each of the identified client systems. The client system includes a request generator that generates a variety of requests according to the game progress. The client system further includes a controller that controls display action based on the character information associated with the flags.

According to a second aspect of the invention, there is provided a game server system for providing a network game environment. The game server system includes a client management system that manages client systems by identifying the client systems individually based upon client information added to requests sent from the client systems via the network the client information indicating which client system sent the request. The game server system further includes a flag information management system that manages flags indicating character information in response to the requests from the client systems occurring during the game progress. The flags are associated with the client information on each of the identified client systems. The game server system further includes a flag information transmitter that transmits only the character information associated with the flags, to the identified client systems. The game server system further includes a communication interface that receives the requests from the client systems. The game server system further includes a storage that stores a flag table, including flags associated with multiple characters, in association with the client information for each of the identified client systems.

According to a third aspect of the invention, there is provided a client system that generates a variety of requests in accordance with network game progress provided by a game server system. The client system includes a request generator that generates the requests in accordance with the network game progress. The client system further includes a controller that controls display action based upon information sent from a flag information management system, the information being associated with a flag.

According to a fourth aspect of the invention, there is provided a network game processing method for transferring client information and character information in accordance with game progress between a game server system that provides a network game environment and multiple client systems connected with the game server system via a network. The method includes, by using the game server system, managing the client systems by identifying the client systems individually based upon the client information added to requests sent from the client systems. The client information indicates which client system sent the request. The method further includes, by using the game server system, managing flags indicating the character information in response to the requests from the client systems occurring during the game progress. The flags are associated with the client information for each of the identified client systems. The method further includes, by using the game server system transmitting only the character information associated with the flags, to the identified client systems. The method further includes, by using the game server system, receiving the requests from the client systems via a communication interface. The method further includes, by using the game server system, storing a flag table, including the flags associated with multiple characters, in association with the client information for each of the identified client systems. The method further includes, by using one of the client systems generating a variety of requests according to the game. The method further includes, by using one of the client systems, controlling display action based upon the character formation associated with the flags.

According to a fifth aspect of the invention, there is provided a recording medium on which is recorded a program. The program causes a computer to manage, by a client management system, client systems by identifying the client systems individually based upon client information added to requests sent from the client systems via a network. The client information indicates which client system sent the request. The program further causes a computer to manage, by a flag information management system, flags indicating character information in response to the requests from the client systems occurring during game progress. The flags are associated with the client information for each of the identified client Systems. The program further causes a computer to transmit, by a flag information transmitter, only the character information associated with the flags, to the identified client systems. The program further causes a computer to receive, by a communication interface, the requests from the client systems. The program further causes a computer to store, by a storage, a flag table, including the flags associated with multiple characters in association with the client information for each of the identified client systems.

According to a sixth aspect of the invention, there is provided a recording medium on which is recorded a program. The program causes a computer to generate, by a request generator, a variety of requests according to game progress. The program further causes a computer to control, by a controller, display action based on character information associated with flags.

BRIEF DESCRIPTION OF THE DRAWINGS

FIG. 4 is a diagram showing a flag table for storing flags managed by a flag information management unit of FIG. 2;

DESCRIPTION OF THE PREFERRED EMBODIMENTS

Embodiments of the invention will be described with reference to the accompanying drawings.

Figure 1:
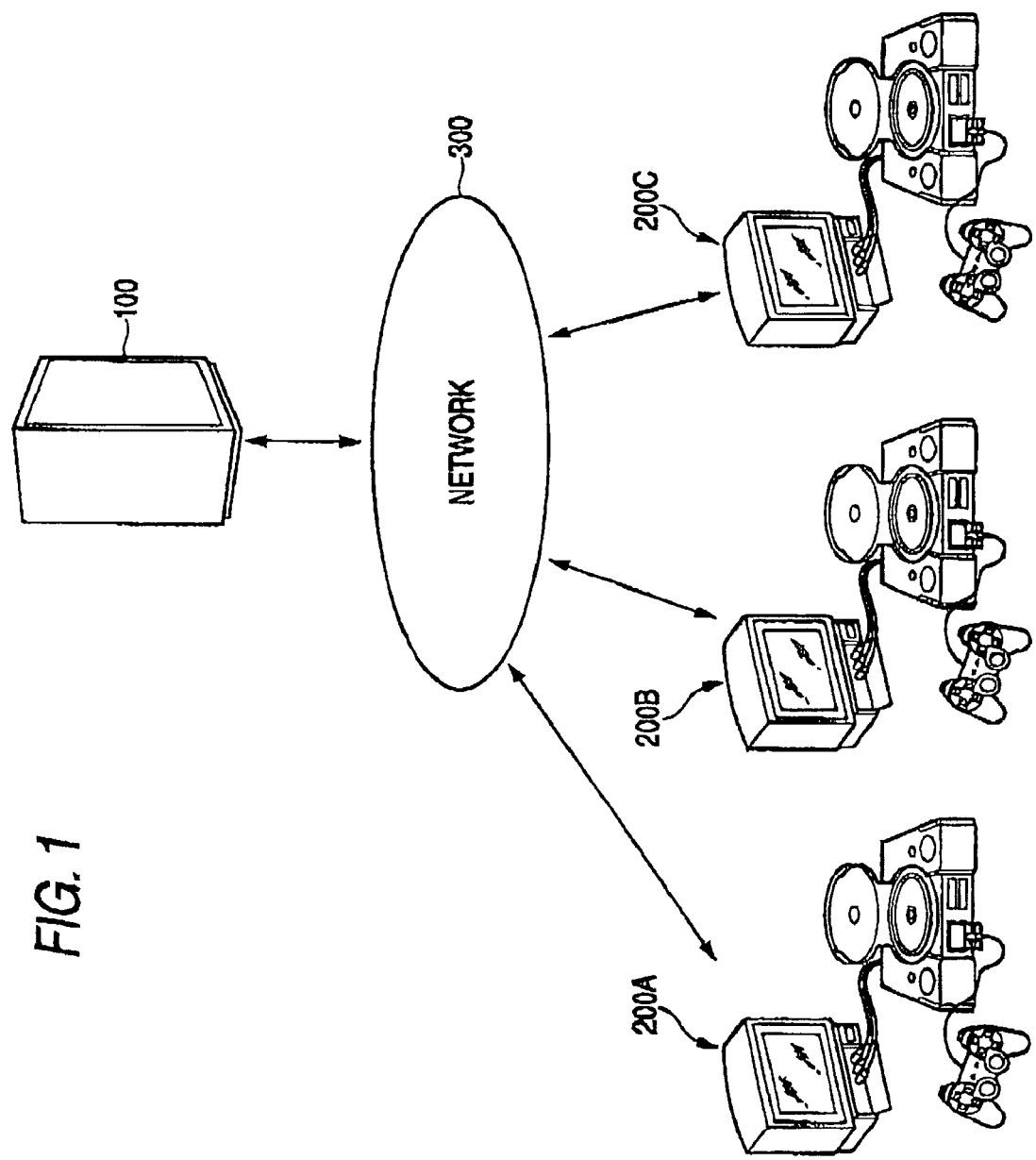
FIG. 1 is a diagram showing one embodiment of a network game system according to an embodiment of the invention.

FIG. 1 is a diagram showing one embodiment of the network game system of the invention. The network game system shown in FIG. 1 is constructed such that a game server 100, acting as a game server system for providing the environment of the network game, and clients (or communication terminals) 200A, 200B and 200C, acting as client systems to be used when the clients participate in a game, can communicate with each other through a network 300.

In the network game system shown in FIG. 1, moreover, especially the information of a player character (PC) to be frequently transmitted from the game server 100 to each of the client systems (or communication terminals) 200A, 200B and 200C is noted. This information is managed in a flag mode, and only the information linked to the flag is transmitted to each client system (or transmission terminal) 200A, 200B or 200C.

Between the game server 100 serving as the game server system and the individual clients (or communication terminals) 200A, 200B and 200C serving as the client systems, only the information that is linked to the flag managing the information of the player character (PC) is transmitted from the game server 100 to the individual client systems (or communication terminals) 200A, 200B and 200C, as described above. Requests (later described) are transmitted from the individual client systems (or communication terminals) 200A, 200B and 200C to the game server 100.

Figure 2:
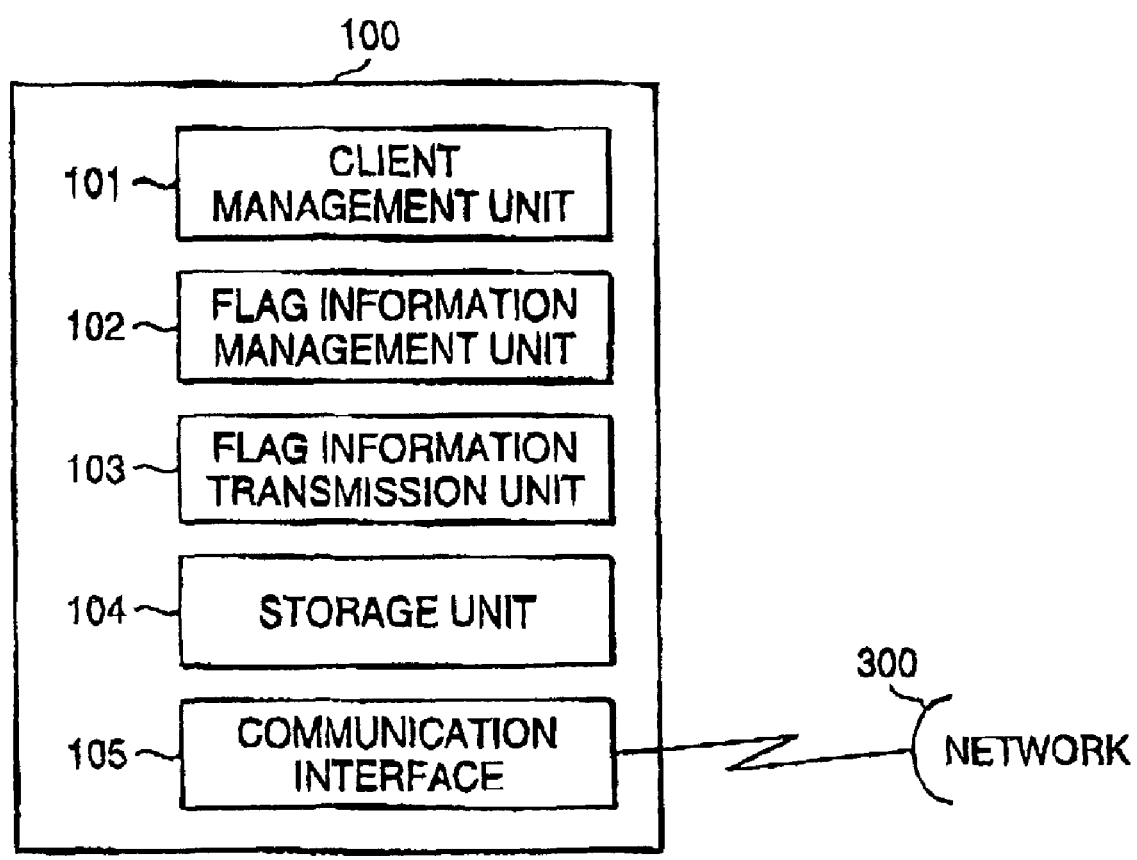
FIG. 2 is a diagram showing the detail of a game server of the network game system of FIG. 1.

The game server 100 is provided with a client management unit 101, a player character management unit 102, a flag information transmission unit 103, a storage unit 104 and a communication interface 105 as shown in FIG. 2.

The client management unit 101 manages the individual client systems (or communication terminals) 200A, 200B and 200C to be accessed through the network 300. For this management, for example, the individual client systems (or communication terminals) 200A, 200B and 200C are identified based upon data indicating the transmitter and added to the later-described requests from the individual client systems (or communication terminals) 200A, 200B and 200C. The discrimination results are held as client information.

The flag information management unit 102 manages the information of the player character (PC) according to the later-described requests occurring during the progress of a game from the individual clients (or communication terminals) 200A, 200B and 200C, with the flag linked to the client information. Here, the flag indicates the erasure, movement modification, equipment change, status transition and so on of the player character (PC) accompanying the game progress, as will be detailed hereinafter.

Moreover, the flag information management unit 102 manages what information is updated (or transmitted), for the individual client systems (or communication terminals) 200A, 200B and 200C, with a flag table FT, as shown in FIG. 4, and performs transmissions according to the individual flags in the flag table FT and clearances of the transmitted flags after transmission.

Here, the case in which the flags are managed based upon the flag table FT of FIG. 4 is defined in the following manner. In FIG. 4, moreover, the client (or communication terminal) 200A is assumed to be a client (A) or client information, and the client system (or communication terminal) 200B is assumed to be a client (B) or client information. It is also assumed that the characters contain the player characters (PC) A to D, - - -, and so on and the non-player character (NPC) X.

1) The individual clients (A) to (X) are provided with the flags of all characters.
2) In the case of a state transition of a character, all the clients (A) to (X) are set with the flags of characters in accordance with the contents of the state.
3) When a character goes away from any of the characters of the clients (A) to (X) (i.e., outside of a predetermined range), an active flag (AFLG) is defined as a special flag indicating what character is displayed. (This is because it is necessary to turn OFF the display of one character having gone away from the character being operated (i.e., to the outside of the predetermined range), for the screen display on the client of the player operating another player character).
4) When updating the information, the active flags, other than those of the clients (A) to (X) having transmitted the information, are cleared.
5) Specific flag examples and the meanings of the individual BITs indicating the pieces of information linked to the individual flags are shown below.

<Example of Meaning of BIT>

| Binary Notation | Hexadecimal Notation | |
|---|---|---|
| (0000 0001) | "01" . . . | Active Flag (to Send Information to Client or not) |
| (0000 0010) | "02" . . . | Erasure Instruction (Erasure Instruction Information to Client) |
| (0000 0100) | "04" . . . | Movement Instruction (Position Information to Client) |
| (0000 1000) | "08" . . . | Equipment Changing Instruction (Equipment Information to Client) |
| (0001 0000) | "10" . . . | Status Changing Instruction (All Information of Movement & Equipment Changes to Client) |
| (0100 0000) | "40" . . . | Effect Display of Character Itself (Aura etc) |
| (1000 0000) | "80" . . . | Re-Size (Increase or Decrease in Character Size) |

Here, the case (0000 1111) in which all four of the lower digits are 1 in the binary notation is expressed by "F" in hexadecimal notation. The case (0000 1110) in which three digits of the lower four digits are 1 is expressed by "E".

Therefore, the binary notation (1111 1110) is expressed by "FE" in hexadecimal notation and indicates the state in which all flags, other than the active flag, are set according to the aforementioned definition. This hexadecimal value is written in the flag table FT. Of course the meaning of each BIT (as described above) is only one example and can be suitably modified according to the contents of the network game.

The flag information transmission unit 103 transmits only the information that is linked to the flag managed by the flag information management unit 102, to the individual client systems (or communication terminals) 200A, 200B and 200C.

The storage device 104 is provided with the flag table FT which is managed by the flag information management unit 102, as shown in FIG. 4. The communication interface 105 transfers information with the individual client systems (or communication terminals) 200A, 200B and 200C via the network 300, and receives the later-described requests from the individual client systems (or communication terminals) 200A, 200B and 200C, for example.

Figure 3:
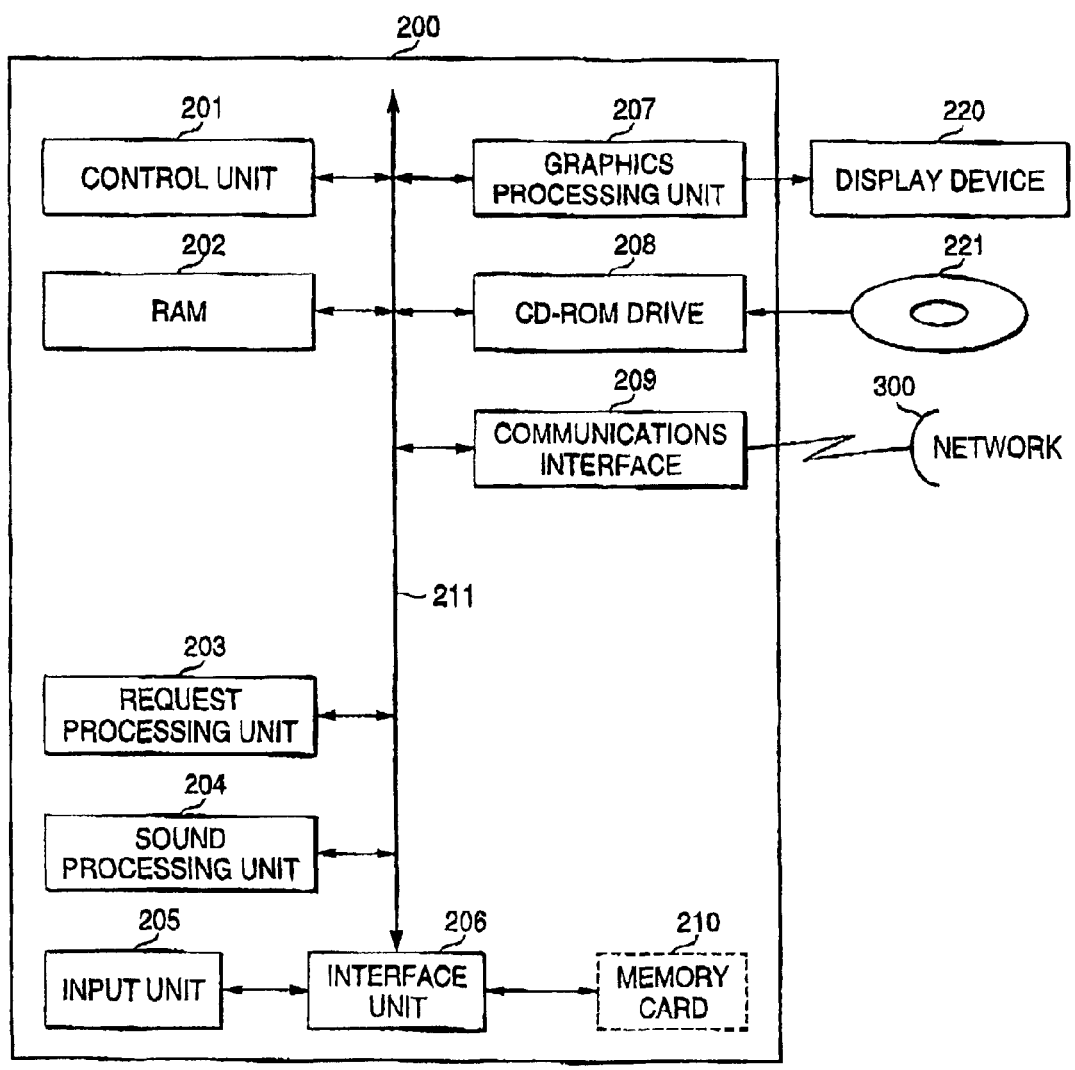
FIG. 3 is a diagram showing the detail of a client system (or communication terminal) of the network game system of FIG. 1.

Each of the individual client systems (or communication terminals) 200A, 200B and 200C is provided, as shown in FIG. 3, with a control unit 201, a RAM 202, a request processing unit 203, a sound processing unit 204, an input unit 205, an interface unit 206, a graphics processing unit 207, a CD-ROM drive 208 and a communications interface 209. Moreover, data are transferred among the individual units via a data bus 211. With this data bus 211, moreover, there is connected a hard disk drive (HDD), although not shown, which is a storage area for storing programs and data.

The control unit 201 controls the actions of the individual units in accordance with predetermined control programs stored in a not-shown ROM. In response to the information linked to the flag from the game server 100, moreover, the control unit 201 controls the CD-ROM drive 208 according to the information to reproduce the necessary information from a CD-ROM 221. The RAM 202 is stored with the game programs, the audio/video data and so on of the CD-ROM 221 to be reproduced by the CD-ROM drive 208, for example.

The request processing unit 203 generates the later-described request according to the game progress. The generated requests can be transmitted to the game server 100 by the packet communications, for example. Moreover, the requests transmitted can be discarded.

Here, the requests are as follows, if the network game is exemplified by the "role-playing game". Specifically, the role-playing game progresses to some goal or without any special goal. In the game having a goal, the player acts as the characters of the game by controlling the characters thereby to clear several events. The actions of the characters are decided by the controls of the player. The events are cleared if their clearing conditions are satisfied by the action results. Each time an event is thus cleared, the player approaches the final goal (or event).

As a virtual world reproduced in a role-playing game, there is not only a world such as a real world, but a fantasy world where heroes play active parts, the universe that is likely to appear in science fiction (SF), or any other fictional worlds.

Each player of the role-playing game controls, for example, any one of the characters or the residents of those worlds so that the player progresses as the character. In this case, the player selects at least one of the characters, etc.

For the game progress, it is necessary to clear the events that are prepared in advance. For this necessity, the player is required to input the controls to cause the character to take desired actions. The actions of the character includes moving actions such as walk or run, motion actions such as swinging a sword or using magic, equipment changing actions and so on. Each time the player causing the character to perform these actions, there is generated a request according to the desired action.

The sound processing unit 204 converts the audio data stored in the RAM 202, into analog signals in accordance with the game progress, and outputs the converted analog signals. The input unit 205 inputs the data indicating the control instructions coming from a controller, a keyboard, a remote control and so on.

The interface unit 206 exchanges the game information with a memory card 210. The graphics processing unit 207 converts the video data stored in the RAM 202, into analog signals in accordance with the game progress, and outputs the analog signals converted to a display device 220.

The CD-ROM drive 208 reproduces the data of the CD-ROM 221. The communication interface 209 performs the communications with the network 300.

Here, the client systems (or communication terminals) 200A, 200B and 200C can be exemplified by any of a personal computer, a notebook computer, a PDA (Personal Digital Assistant), a mobile telephone, a Web TV and a game machine having the communicating function.

Here will be described the network game processing method in the network game system of FIG. 1. First of all, the fundamental state transition will be described with reference to FIG. 5. In the following description, there is conveniently exemplified the case in which the character A of the client (A) plays the network game with the non-player characters (NPC) ① to ④.

Figure 5:
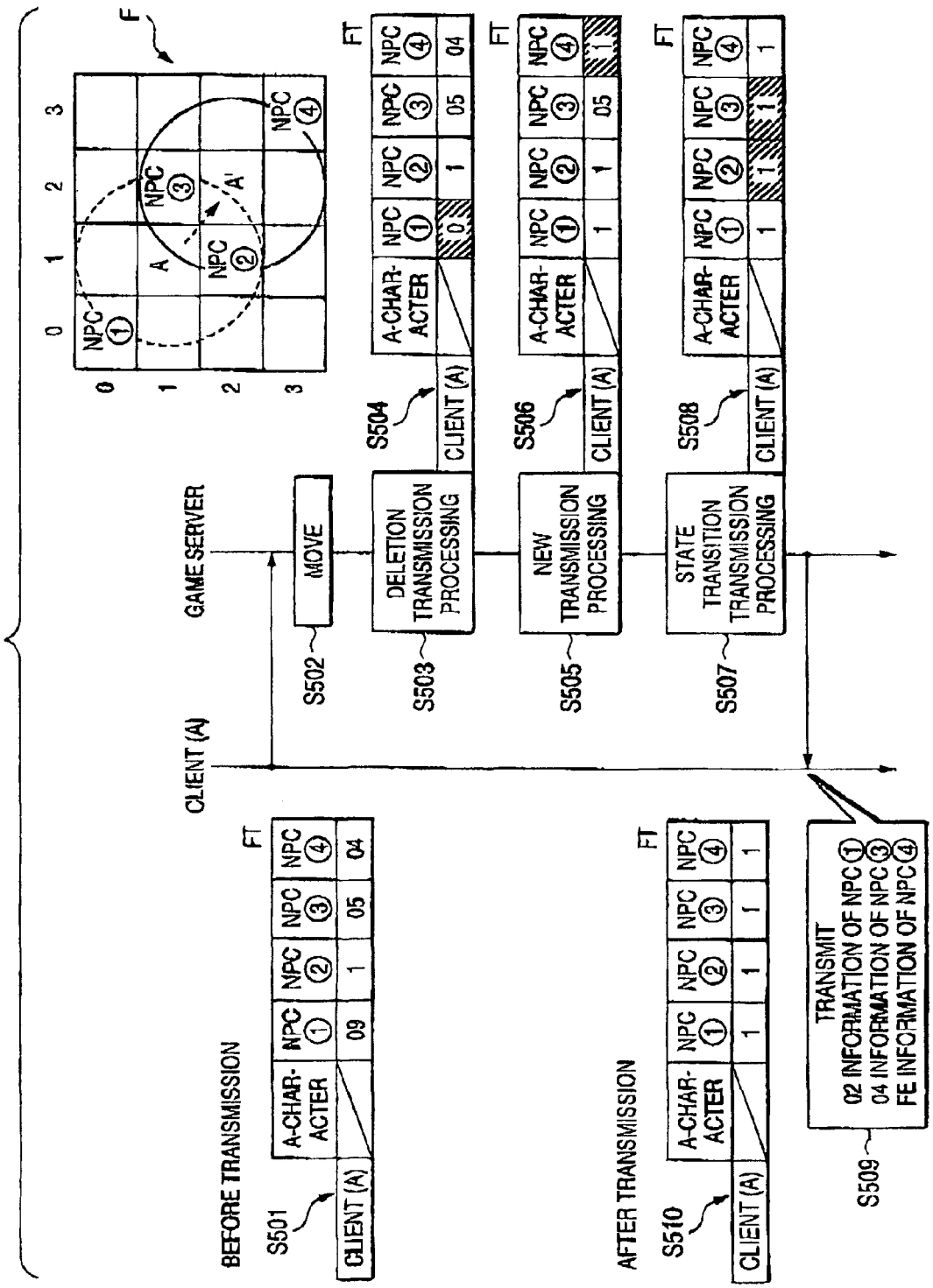
FIG. 5 is a diagram for explaining a fundamental state transition in a network game processing method in the network game system of FIG. 1.

In FIG. 5, it is assumed that, before the transmission (at Step 501) of information at the game server 100, the flags "09", "1", "05" and "04" in the hexadecimal notation are written in the non-player characters (NPC) ① to ④ of the flag table FT, respectively.

Here, the flag "09" indicates (0000 0001) "01" and (0000 1000) "08" of the aforementioned definition. The flag "05" indicates (0000 0001) "01" and (0000 0100) "04" of the aforementioned definition. The flag "04" indicates (0000 0100) "04" of the aforementioned definition.

Here, it is assumed that, in the field F or the area where each character can move, the character A moves (at Step 502) from a virtual cell (1, 1) to a cell (2, 2), as indicated by A'. Then, deletion transmission processing is done (at Step 503). Here, the non-player character (NPC) ① goes outside of the area of the character A' (at Step 504), so that the value "0" indicating the state (or initial state) in which all the flags are OFF at the non-player character (NPC) ① is written. Here, the area of the character A' indicates the portion which is enclosed by a solid circle in the field F. In other words, the circled area corresponds to the displayed area of the screen of the client system (or communication terminal) who controls the character A.

Figure 6:
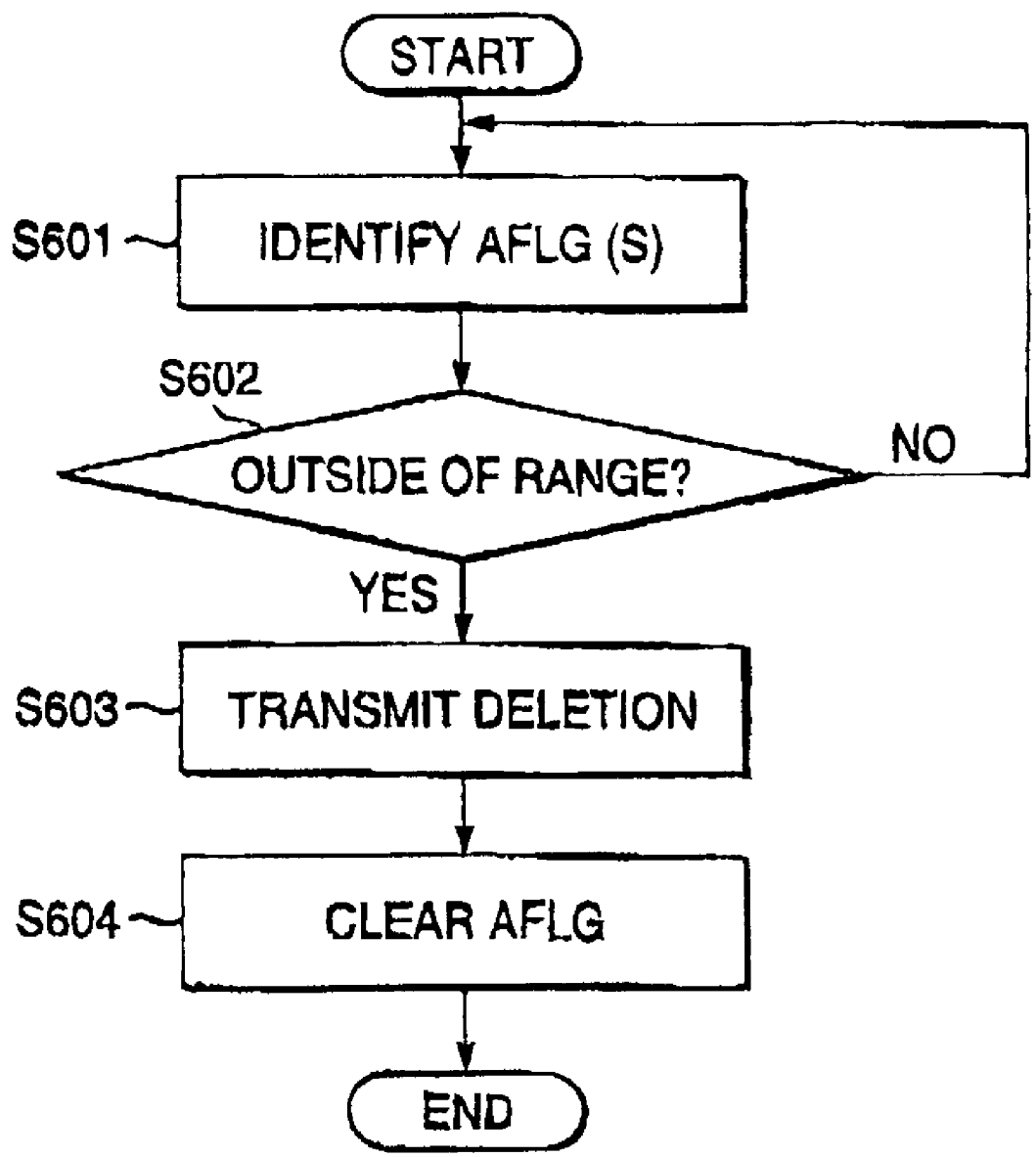
FIG. 6 is a flow chart for explaining an algorithm of a deletion transmission processing of FIG. 5.

In the algorithm of this deletion transmission processing, as shown in FIG. 6: the active flags of other characters are initially identified (at Step 601). Next, it is judged whether the position of other characters is out of the predetermined area of character A (at Step 602). If this answer is YES, the deletion instruction is transmitted (at Step 603), and the active flag is cleared (at Step 604).

Next, new transmission processing is done (at Step 505), as shown in FIG. 5. Here, the area of the moved character A' contains the non-player character (NPC) ④ so that the value "1" is written (at Step 506) in the non-player character (NPC) ④.

Figure 7:
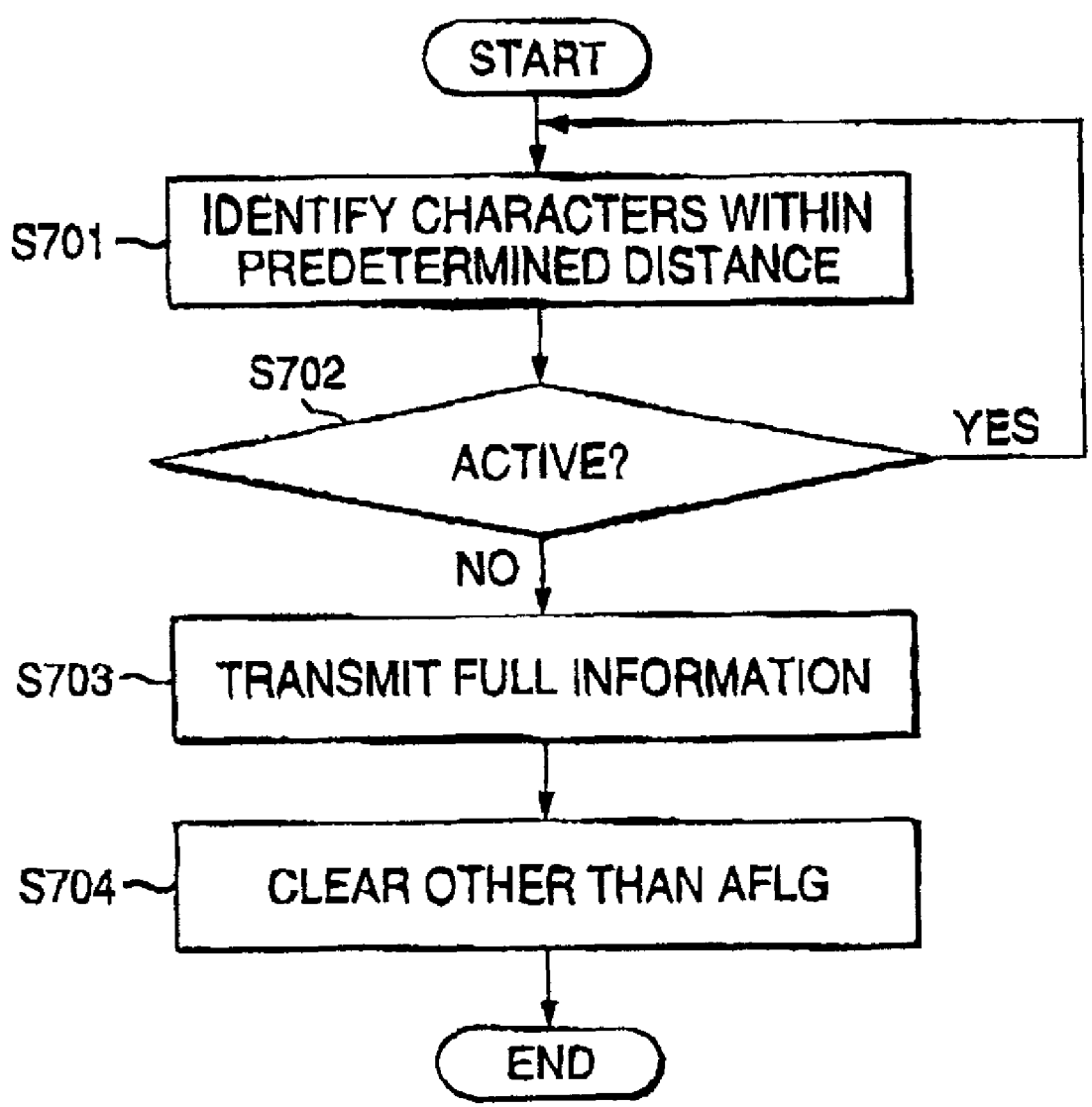
FIG. 7 is a flow chart for explaining an algorithm of a new transmission processing of FIG. 5.

In the new transmission processing algorithm, as shown in FIG. 7: initially, characters within a predetermined distance are identified (Step 701). Next, it is judged whether the flags of the identified characters are active (at Step 702) and if this answer is NO, the full information is transmitted (at Step 703), and all flags other than the active flag are cleared (at Step 704). Here, the predetermined distance is defined as the distance obtained from the coordinates between the individual player characters (PC) when an arbitrary field F is divided with two-dimensional cells. Moreover, the judgment (at Step 702) judges whether the information is to be transmitted, and the clearance (at Step 704) of flags other than the active flag turns ON the active flag.

After the new transmission processing, the state transition transmission processing is done (at Step 507) as shown in FIG. 5. Here, the value "1" is written (at Step 508) in the portion of the non-player character (NPC) ③.

Figure 8:
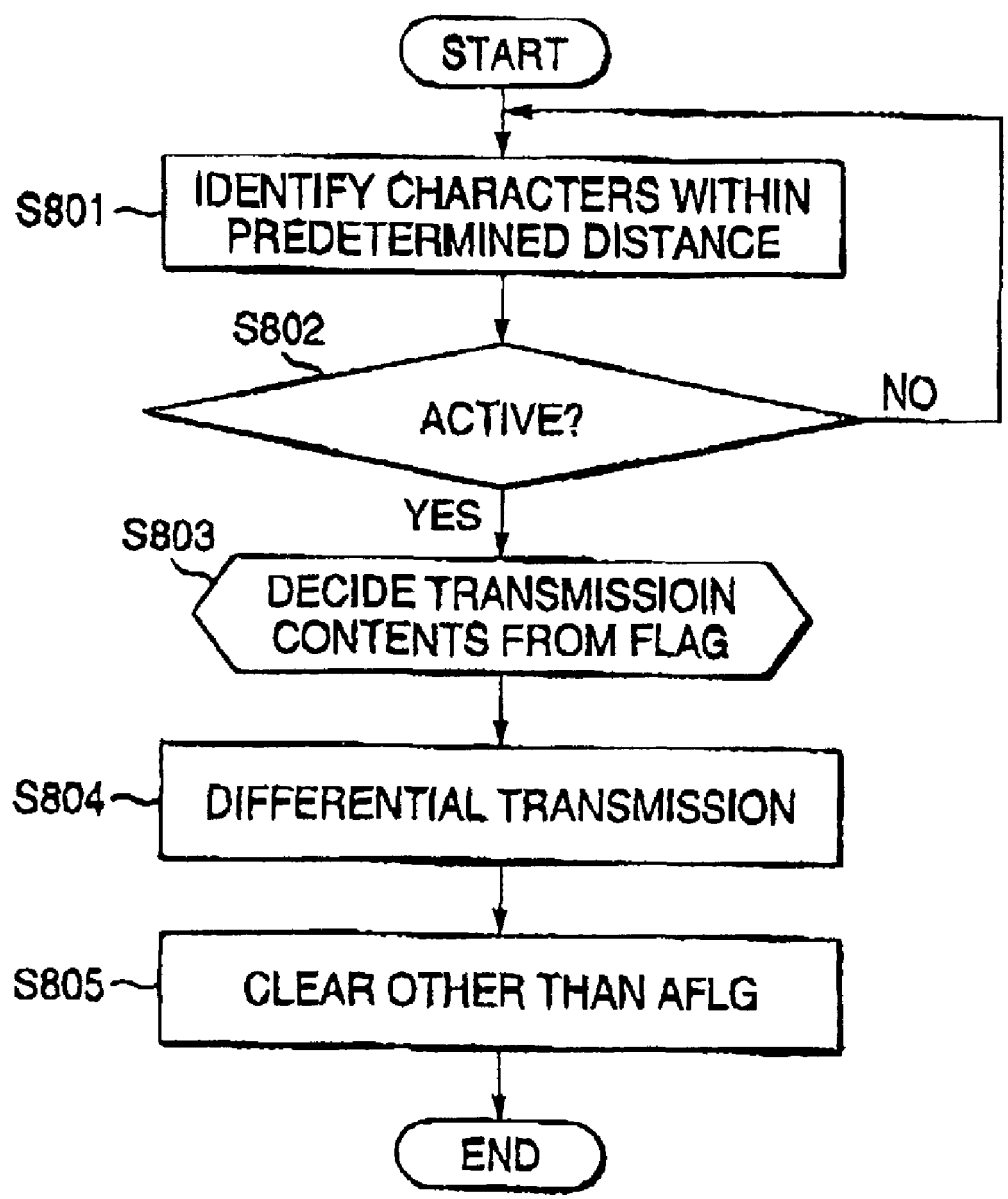
FIG. 8 is a flow chart for explaining an algorithm of a state transition transmission processing of FIG. 5.

In the state transition transmission processing algorithm, as shown in FIG. 8, characters within a predetermined distance are identified (at Step 801). Next, it is judged whether the flags of the identified characters are active (Step 802). If this answer is YES, the transmission contents are decided (at Step 803) based upon the flags. Then, a differential transmission is done (at Step 804). Finally, all flags other than the active flag are cleared (at Step 805). Here, the differential transmission (at Step 804) transmits only the information which has been changed by the state transition indicated by the flag.

By the processing thus far described, there are transmitted (at Step 509) from the game server 100 to the client (A): the information (or erasure information) linked to the flag "02" of the non-player character (NPC) ① the information (or positional information) linked to the flag "04" of the non-player character (NPC) ③; and the information (or positional information and equipment information) linked to the flag "FE" of the non-player character (NPC) ④. Here, the letters FE designate the information which is expressed by the hexadecimal notation and in which all the flags other than the active flag exist, as has been described above.

Next, the specific state transition in the network game processing method in the network game system of FIG. 1 will be described with reference to FIGS. 9A and 9B. In the drawing, there is shown the case in which the character A controlled by the client (A) plays the network game with the character B controlled by the client (B) and the non-player characters (NPC) ① to ③. Moreover, the client (A) serving as the client information is the client (or communication terminal) 200A, and the client (B) serving as the client information is the client system (or communication terminal) 200B.

Figure 9:
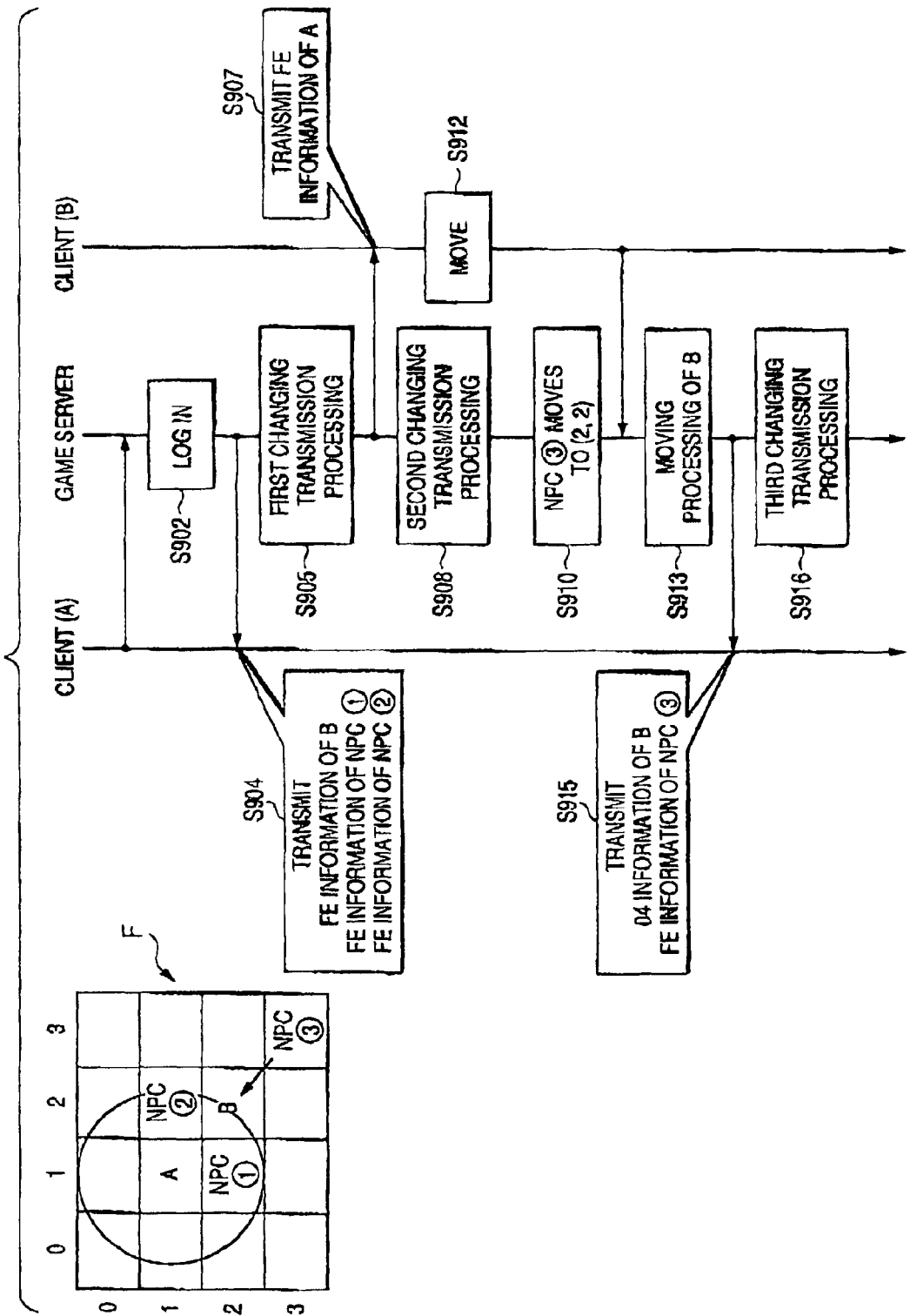
FIGS. 9A and 9B are diagrams for explaining a specific state transition in the network game processing method of the network game system of FIG. 1.
Figure 10:
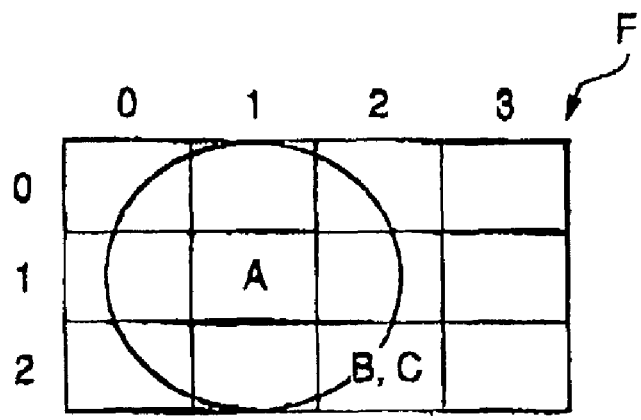
FIG. 10 is a diagram showing a field for explaining pieces of information on a player character (PC) to be transmitted from a game server to each client in the network game of the prior art.
Figure 11:
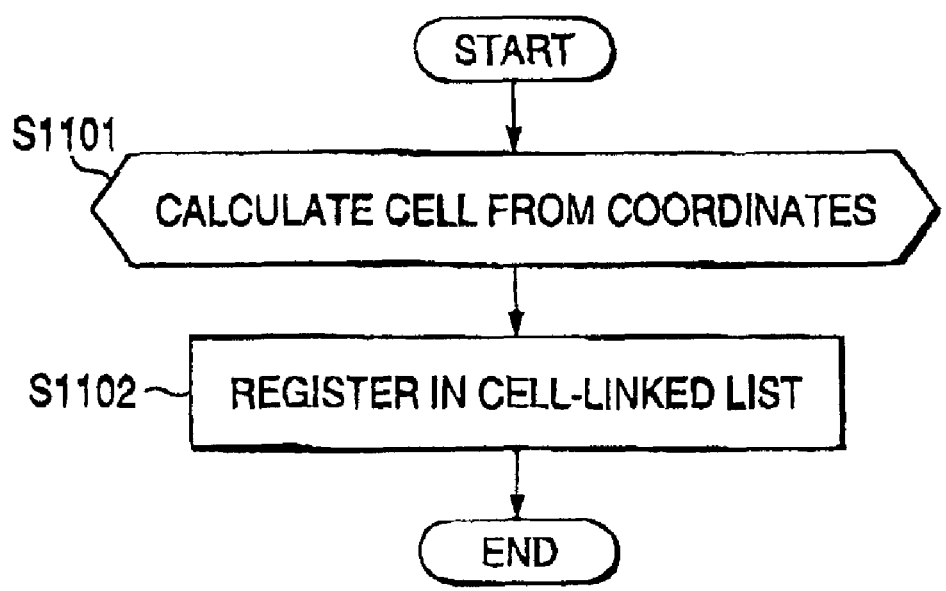
FIG. 11 is a flow chart for explaining a new addition processing in the network game of the prior art.
Figure 12:
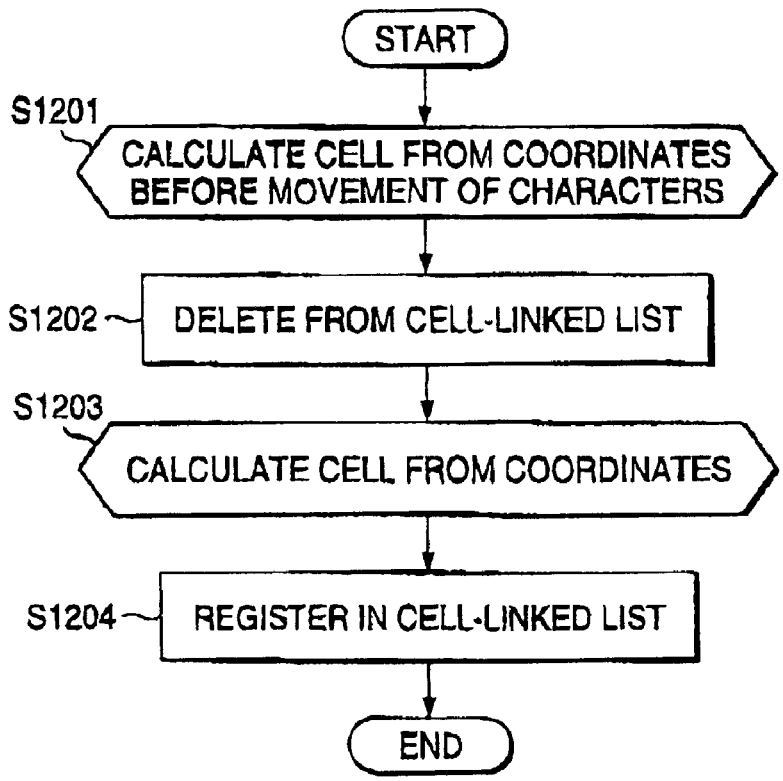
FIG. 12 is a flow chart for explaining a modification (or movement) processing in the network game of the prior art.
Figure 13:
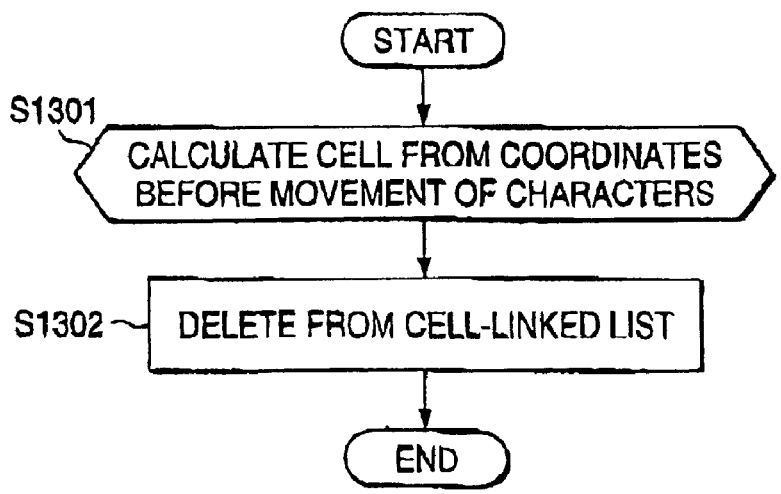
FIG. 13 is a flow chart for explaining a deletion (or erasure) processing in the network game of the prior art.
Figure 14:
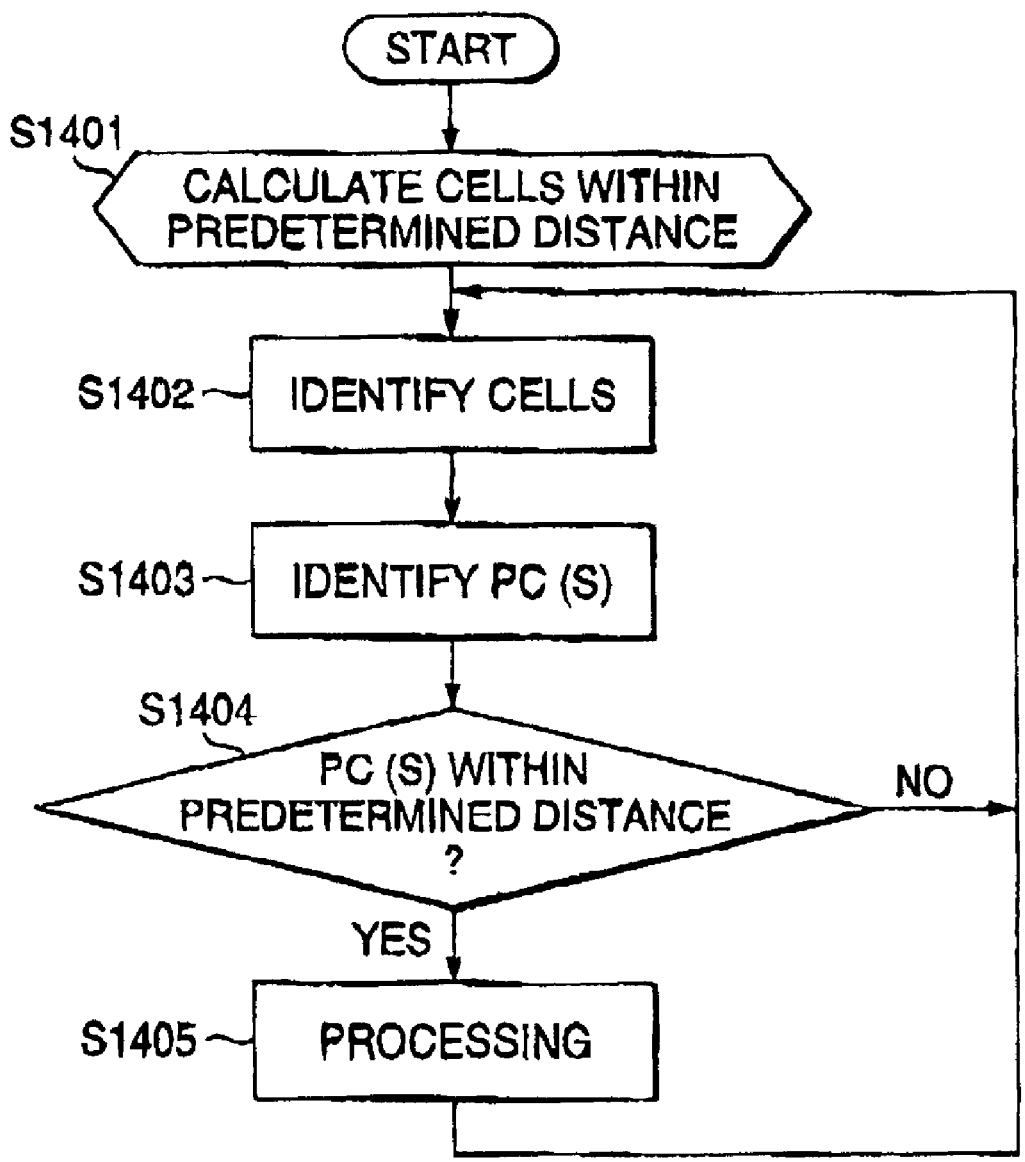
FIG. 14 is a flow chart for explaining an enumeration processing in terms of distance in the network game of the prior art.

First of all, the flag table FT managed by the flag information management unit 102 on the side of the game server 100 is initialized (at Step 901), as shown in FIG. 9B. It should be noted that, in FIG. 9B, a case is discussed where the client (A) is going to log on the game server 100 (at Step 901), and has logged on the game sever 100 (at Step 902), while the client B has already been logged-on. At Step S901, the client (A) has not yet logged on the game server 100, therefore, the client (A) has no information on the character B and non-player characters (NPC) {circle over (1)} to {circle over (3)}. Thus, the flags of the character B and the non-player characters (NPCs) {circle over (1)} to {circle over (3)} for the client (A) are set individually to "0". The value "0" indicates that all flags are OFF, that is, the active flag is OFF. On the other hand, because the client (B) has already logged on the game server 100 and already has information on non-player characters (NPCs) {circle over (1)} to {circle over (3)}, the flags of the non-player characters (NPCs) (circle over (1)) to {circle over (3)} for the client (B) are individually set to "1". The value "1" indicates only the active flags is ON, that is, all information on the corresponding characters has been updated. Also, at step S901, no information on the character A is sent to the client (B), because the client (A) has not been logged on the game server 100, therefore, the flag of the character A for the client (B) is set to "0".

If the game server 100 is logged in (at Step 902) from the client (A), in the flag table FT managed at the log-in time by the flag information management unit 102, the hexadecimal flag FE is written in the character B and the non-player characters (NPC) ① to ③ for the client (A) (at Step 903). The hexadecimal flag FE is also written in the character A for the client (B). Here, the flag FE is a hexadecimal flag indicating that all the flags other than the active flag are ON.

Here, the flag FE contains, as indicated by the field F (FIG. 9B), the flags, to which there are linked the pieces of information of the character A of (1, 1), the character B of (2, 2), the non-player character (NPC) ① of (1, 2), the non-player character (NPC) ② of (2, 1) and the non-player character (NPC) ③ of (3, 3).

When the writing of these flags is finished, full information on the character B and full information on the non-player characters (NPC) ① and ② are transmitted (at Step 904) at a predetermined timing from the game server 100 to the client (A). This is because the character B and the non-player characters (NPC) ① and ② are contained in the area indicated by the solid circle of the character A as shown in the field F. As a result, the character B and the non-player characters (NPC) ① and ②, which exist in the predetermined area of the character A, are displayed on the screen of the client (A). When the transmission of the information on the character B and the non-player characters (NPC) ① and ② to the client (A) is finished, the flags corresponding to the individual characters are rewritten at Step 906 from "FE" to "1".

When the transmission of the information to the client (A) is finished, a first changing transmission processing is done (at Step 905). As indicated at Step 906, the flags of the character B and the non-player characters (NPC) ① and ② for the client (A) are rewritten from "FE" to "1" or the active flag.

Next, the full information on the character A is transmitted (at Step 907) from the game server 100 to the client (B). When the transmission of the information to the client (B) is finished, a second changing transmission processing is done (at Step 908). Specifically, the flag "1" or the active flag is written (at Step 909) in the portion of the character A for the client (B).

If the non-player character (NPC) ③ moves (at Step 910) from (3, 3) to (2, 2), as indicated by the field F, the flag "05" is written (at Step 911) in the portion of the non-player character (NPC) ③ for the client (B). Here, the flag "05" indicates that the two flags of (0000 0001) "01" and (0000 0100) "04" of the aforementioned definition are ON.

If the character B then moves (at Step 912) in the same cell (2, 2), a moving processing of the character B is done (at Step 913). Specifically, the flag "05" like the aforementioned one is written (at Step 914) in the portion of the character B for the client (A).

When the writing of the flag is finished, the game server 100 transmits to the client (A) the information (or positional information) linked to the flag "04" of the character B, and the full information on the non-player character NPC ③ (Step 915). On the side of the client (A), therefore, there are displayed the character B and the non-player characters (NPC) ① to ③, which exist within a predetermined range of the character A, as shown in the field F.

When the transmission to the client (A) is finished, a third changing transmission processing is done (at Step 916). Specifically, the active flag "1" is written in the portion of the character B and the portion of the non-player character (NPC) ③ for the client (A) (Step 917).

Thus, in the embodiment, the flag information management unit 102 of the game server 100 manages the flags indicating the information on the player characters (PC) in response to the requests occurring during the progress of the network game and coming from the client systems (or communication terminals) 200A, 200B and 200C. In addition, the flag information transmission unit 103 transmits only the information linked to the managed flags, i.e., only the changed information to the client systems (or communication terminals) 200A, 200B and 200C. Then, on the sides of the client systems (or communication terminals) 200A, 200B and 200C, the control unit 201 controls the CD-ROM drive 208 in accordance with the received information, and the necessary information is reproduced from the CD-ROM 221. Therefore, the quantity of the information to be transmitted from the game server 100 to each of the client systems (or communication terminals) 200A, 200B and 200C is minimized so that the network response to the game server 100 can be prevented from deteriorating.

Moreover, the flags managed by the flag table FT are made to correspond to the information to be frequently transmitted, such as the erasure, position changing, equipment change, status change and so on of the character accompanying the game progress. It is indicated by the active flag what information is transmitted to any of the client systems (or communication terminals) 200A, 200B and 200C, so that the information to be transmitted can be easily managed.

Here, the embodiment has been described by assuming that the field F is two-dimensional, but the field F may be three-dimensional.

According to the invention, as has been described above, it is possible to prevent the network response to the game server from deteriorating.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

What is claimed is:

1. A network game system, comprising:
   a game server system that provides a network game environment; and
   a plurality of client systems connected with the game server system via a network, wherein client information and character information are transferred in accordance with game progress between the game server system and the client systems,
   the game server system comprising:
      a client management system that manages the client systems by identifying the client systems individually based upon the client information added to requests sent from the client systems via the network, the client information indicating which of the client systems sent each of the requests;
      a flag information management system that manages flags indicating a status of character information in response to the requests from the client systems occurring during the game progress, the flags being associated with the client information for each of the identified client systems, the flags comprising:
         an active flag that indicates whether a full transmission or a differential transmission should occur;
         an equipment changing instruction flag indicating changes in equipment information to each of the identified client systems;
      a flag information transmitter that transmits only the character information associated with the flags, to the identified client systems, full information being transmitted when the active flag is not set and becomes set, differential information being transmitted when the active flag is set, the differential information being defined by which other ones of the flags are set;
      a communication interface that receives the requests from the client systems; and
      a storage that stores a flag table, comprising the flags associated with a plurality of characters in association with the client information for each of the identified client systems, and
   the client system comprising:
      a request generator that generates a variety of the requests according to the game progress; and
      a controller that controls display action based on the character information associated with the flags.

2. The network game system of claim 1, the flags further comprising at least one of:
   an erasure instruction flag indicating erasure instruction information to each of the identified client systems;
   a movement instruction flag indicating position information of the client systems;
   a status changing instruction flag indicating all changes in movement and equipment changes to each of the identified client systems;
   a character display flag indicating a change in an image of one of the plurality of characters; and
   re-size flags indicating an increase or decrease in a size of one of the plurality of characters.

3. A game server system for providing a network game environment, comprising:
   a client management system that manages client systems by identifying the client systems individually based upon client information added to requests sent from the client systems via the network, the client information indicating which of the client systems sent each of the requests;
   a flag information management system that manages flags indicating a status of character information in response to the requests from the client systems occurring during game progress, the flags being associated with the client information on each of the identified client systems, the flags comprising:
      an active flag that indicates whether a full transmission or a differential transmission should occur;
      an equipment changing instruction flag indicating changes in equipment information to each of the identified client systems;
      a flag information transmitter that transmits only the character information associated with the flags, to the identified client systems, full information being transmitted when the active flag is not set and becomes set, differential information being transmitted when the active flag is set, the differential information being defined by which other ones of the flags are set;
      a communication interface that receives the requests from the client systems; and
      a storage that stores a flag table, comprising flags associated with a plurality of characters, in association with the client information for each of the identified client systems.

4. The game server system according to claim 3, wherein the flag information management system manages the character information on each of the client systems, by setting, in the flag table, the flags corresponding to each of the plurality of characters in response to the requests from the client systems, the flags being associated with the client information, and by transmitting the character information associated with the flags and clearing the flags corresponding to the transmitted character information.

5. The game server system according to claim 3, wherein the flag information management system executes:
   a deletion transmission processing that identifies the flags indicating which of the plurality of characters are displayed based upon the flag table, judges whether there is a character that is not within a predetermined distance from a certain character, and, when it is judged that the character is not within the predetermined distance, transmits information associated with a deletion flag so as to clear the deletion flag; and a new transmission processing that identifies a position of one character with respect to another character in an arbitrary field, obtained by dividing an area where the plurality of characters can move into a plurality of virtual cells, and, when it is judged that the one character is within a predetermined distance from the other character, transmits all of the character information on the one character to a client system of the other character and clears all of the flags of the one character other than the active flag.

6. The game server system according to claim 3, wherein the flag information management system manages the flags, when a first character responds to control of a first client system by a first player, by:

setting one of the flags relating to the first character and at least one piece of the client information when the first character changes states;

setting a display flag defining whether to display a second character on a screen of the first client system based upon a distance from the first character to the second character; and clearing, when updating the character information, the display flag of the first character of the updated client information.

7. The game server system according to claim 3, wherein the flags are linked to status information of the plurality of characters in accordance with the game progress.

8. The game server system of claim 3, the flags further comprising at least one of:

an erasure instruction flag indicating erasure instruction information to each of the identified client systems;

a movement instruction flag indicating position information of the client systems;

a status changing instruction flag indicating all changes in movement and equipment changes to each of the identified client systems;

a character display flag indicating a change in an image of one of the plurality of characters; and re-size flags indicating an increase or decrease in a size of one of the plurality of characters.

9. A client system that generates a variety of requests in accordance with network game progress provided by a game server system, comprising:

a request generator that generates the variety of requests in accordance with the network game progress; and a controller that controls display action based upon information sent from a flag information management system, the information being associated with flags indicating a status of character information in response to the variety of requests from client systems occurring during the game progress, the flags comprising:

an active flag that indicates whether a full transmission or a differential transmission should occur;

an equipment changing instruction flag indicating changes in equipment information to each of the client systems;

full information being received when an active flag is not set and becomes set, differential information being received when the active flag is set, the differential information being defined by which other ones of the flags are set.

10. The client system of claim 9, the flags further comprising at least one of:

an erasure instruction flag indicating erasure instruction information to each of the client systems;

a movement instruction flag indicating position information of the client systems;

a status changing instruction flag indicating all changes in movement and equipment changes to each of the client systems;

a character display flag indicating a change in an image of one of the plurality of characters; and re-size flags indicating an increase or decrease in a size of one of the plurality of characters.

11. A network game processing method for transferring client information and character information in accordance with game progress between a game server system that provides a network game environment and client systems connected with the game server system via a network, the method comprising, by using the game server system:

managing the client systems by identifying the client systems individually based upon the client information added to requests sent from the client systems, the client information indicating which of the client systems sent each of the requests;

managing flags indicating a status of character information in response to the requests from the client systems occurring during the game progress, the flags being associated with the client information for each of the identified client systems, the flags comprising:

an active flag that indicates whether a full transmission or a differential transmission should occur;

an equipment changing instruction flag indicating changes in equipment information to each of the identified client systems;

transmitting only the character information associated with the flags, to the identified client systems, full information being transmitted when the active flag is not set and becomes set, differential information being transmitted when the active flag is set, the differential information being defined by which other ones of the flags are set;

receiving the requests from the client systems via a communication interface; and storing a flag table, comprising the flags associated with a plurality of characters, in association with the client information for each of the identified client systems; and the method further comprising, by using one of the client systems:

generating a variety of the requests according to the game progress; and controlling display action based upon the character information associated with the flags.

12. The network game processing method according to claim 11, further comprising:

managing the character information on each of the client systems;

setting, in the flag table, the flags corresponding to each of the plurality of characters in response to the requests from the client systems, the flags being associated with the client information;

transmitting the character information associated with the flag flags; and clearing the flags corresponding to the transmitted character information.

13. The network game processing method according to claim 11, wherein the managing the flags further comprises:

executing deletion transmission processing that identifies the flags indicating which of the plurality of characters are displayed based upon the flag table, judges whether there is a character that is not within a predetermined distance from a certain character, and, when it is judged that the character is not within the predetermined distance, transmits information associated with a deletion flag and clears the deletion flag;

executing new transmission processing that identifies a position of one character with respect to another character in an arbitrary field obtained by dividing an area where the plurality of characters can move into a plurality of virtual cells, and, when it is judged that the one character is within a predetermined distance from the another character, transmits all of the character information on the one character to a client system of the another character and clears all of the flags of the one character other than the active flag.

14. The network game processing method as set forth in claim 11, wherein the managing the flags further comprises, when a first character responds to control of a first client system by a first player:

setting one of the flags relating to the first character and at least one piece of the client information when the first character changes states;

setting a display flag defining whether to display a second character on a screen of the first client system based upon a distance from the first character to the second character; and clearing, when updating the character information, the display flag of the first character of the updated client information.

15. The network game processing method according to claim 11, wherein the flags are linked to status information of the plurality of characters in accordance with the game progress.

16. The network game process method of claim 11, the flags further comprising at least one of:

an erasure instruction flag indicating erasure instruction information to each of the identified client systems;

a movement instruction flag indicating position information of the client systems;

a status changing instruction flag indicating all changes in movement and equipment changes to each of the identified client systems;

a character display flag indicating a change in an image of one of the plurality of characters; and re-size flags indicating an increase or decrease in a size of one of the plurality of characters.

17. A non-transitory recording medium on which is recorded a program causing a computer to execute:

managing, by a client management system, client systems by identifying the client systems individually based upon client information added to requests sent from the client systems via a network, the client information indicating which of the client systems sent each of the requests;

managing, by a flag information management system, flags indicating a status of character information in response to the requests from the client systems occurring during game progress, the flags being associated with the client information for each of the identified client systems, the flags comprising:

an active flag that indicates whether a full transmission or a differential transmission should occur; and an equipment changing instruction flag indicating changes in equipment information to each of the identified client systems;

transmitting, by a flag information transmitter, only the character information associated with the flags, to the identified client systems;

receiving, by a communication interface, the requests from the client systems, full information being transmitted when the active flag is not set and becomes set, differential information being transmitted when the active flag is set, the differential information being defined by which other ones of the flags are set; and storing, by a storage, a flag table, comprising the flags associated with a plurality of characters in association with the client information for each of the identified client systems.

18. The non-transitory recording medium of claim 17, the flags further comprising at least one of:

an erasure instruction flag indicating erasure instruction information to each of the identified client systems;

a movement instruction flag indicating position information of the client systems;

a status changing instruction flag indicating all changes in movement and equipment changes to each of the identified client systems;

a character display flag indicating a change in an image of one of the plurality of characters; and re-size flags indicating an increase or decrease in a size of one of the plurality of characters.

19. A non-transitory recording medium on which is recorded a program causing a computer to execute:

generating, by a request generator, a variety of requests according to game progress; and controlling, by a controller, display action based on character information associated with flags indicating a status of character information in response to the variety of requests from client systems occurring during the game progress, the flags comprising:

an active flag that indicates whether a full transmission or a differential transmission should occur;

an equipment changing instruction flag indicating changes in equipment information to each of the client systems;

full information being received when the active flag is not set and becomes set, differential information being received when the active flag is set, the differential information being defined by which other ones of the flags are set.

20. The non-transitory recording medium of claim 19, the flags further comprising at least one of:

an erasure instruction flag indicating erasure instruction information to each of the client systems;

a movement instruction flag indicating position information of the client systems;

a status changing instruction flag indicating all changes in movement and equipment changes to each of the client systems;

a character display flag indicating a change in an image of one of the plurality of characters; and re-size flags indicating an increase or decrease in a size of one of the plurality of characters.

* * * * *

UNITED STATES PATENT AND TRADEMARK OFFICE
CERTIFICATE OF CORRECTION

Page 1 of 1

PATENT NO.       : 7,927,217 B2
APPLICATION NO.  : 10/319712
DATED            : April 19, 2011
INVENTOR(S)      : M. Kimura It is certified that error appears in the above-identified patent and that said Letters Patent is hereby corrected as shown below:

At column 14, line 63 (claim 12, line 10) of the printed patent, please delete "flag" prior to --flags--.

Signed and Sealed this
Nineteenth Day of July, 2011

David J. Kappos
*Director of the United States Patent and Trademark Office*